United States Patent
Wang (10) Patent No.: US 10,606,117 B2
(45) Date of Patent: Mar. 31, 2020

(54) TRANSPARENT DISPLAY PANELS AND DISPLAY DEVICES

(71) Applicant: BOE TECHNOLOGY GROUP CO., LTD., Beijing (CN)

(72) Inventor: Zifeng Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 72 days.

(21) Appl. No.: 15/565,761

(22) PCT Filed: May 17, 2017

(86) PCT No.: PCT/CN2017/084738
§ 371 (c)(1),
(2) Date: Oct. 11, 2017

(87) PCT Pub. No.: WO2018/036216
PCT Pub. Date: Mar. 1, 2018

(65) Prior Publication Data
US 2018/0284532 A1    Oct. 4, 2018

(30) Foreign Application Priority Data

Aug. 24, 2016  (CN) .......................... 2016 1 0717857

(51) Int. Cl.
*G02F 1/1335*  (2006.01)
*G02F 1/13363*  (2006.01)
(52) U.S. Cl.
CPC .... *G02F 1/133514* (2013.01); *G02F 1/13363* (2013.01); *G02F 1/133502* (2013.01);
(Continued)

(58) Field of Classification Search
CPC ... G02F 1/133502; G02F 2001/133638; G02F 2001/133538; G02F 1/133528
See application file for complete search history.

(56) References Cited

U.S. PATENT DOCUMENTS

2006/0146207 A1* 7/2006 Cho .................... G02F 1/13338
                                                                349/12
2008/0049178 A1* 2/2008 Kisara .................. G02F 1/1395
                                                                349/118
(Continued)

FOREIGN PATENT DOCUMENTS

CN        102707487 A     10/2012
CN        102831837 A     12/2012
(Continued)

OTHER PUBLICATIONS

First Office Action in the Chinese Patent Application No. 201610717857.4, dated Aug. 28, 2018; English translation attached.
(Continued)

*Primary Examiner* — Alexander P Gross
(74) *Attorney, Agent, or Firm* — Intellectual Valley Law, P.C.

(57) ABSTRACT

Transparent, display panel and display device are provided. The transparent display panel includes: a color filter. The color filter includes a first region configured to realize a screen view and a second region configured to display a perspective image. The second region has a thickness smaller than the first region.

9 Claims, 5 Drawing Sheets

(52) U.S. Cl.
CPC ............... *G02F 1/133528* (2013.01); *G02F 2001/133531* (2013.01); *G02F 2001/133638* (2013.01); *G02F 2202/02* (2013.01); *G02F 2203/01* (2013.01)

(56) References Cited

U.S. PATENT DOCUMENTS

| | | | |
|---|---|---|---|
| 2014/0292839 A1 | 10/2014 | Huang | |
| 2015/0042928 A1* | 2/2015 | Won | G02F 1/133377 349/96 |
| 2015/0116636 A1 | 4/2015 | Chen et al. | |
| 2015/0129852 A1* | 5/2015 | Park | H01L 27/3262 257/40 |
| 2016/0070135 A1* | 3/2016 | Im | G02F 1/133514 349/96 |
| 2016/0139456 A1 | 5/2016 | Hsiao et al. | |
| 2016/0161798 A1* | 6/2016 | Lee | G02F 1/133528 349/65 |
| 2016/0238881 A1* | 8/2016 | Chong | G02F 1/133528 |
| 2017/0131593 A1 | 5/2017 | Tang | |

FOREIGN PATENT DOCUMENTS

| | | |
|---|---|---|
| CN | 103543551 A | 1/2014 |
| CN | 103926743 A | 7/2014 |
| CN | 104375314 A | 2/2015 |
| CN | 105242342 A | 1/2016 |
| TW | 201516522 A | 5/2015 |
| WO | 2014162798 A1 | 10/2014 |

OTHER PUBLICATIONS

International Search Report & Written Opinion dated Aug. 14, 2017, regarding PCT/CN2017/084738.

* cited by examiner

+45° left chirality

FIG. 4

-45° right chirality

TRANSPARENT DISPLAY PANELS AND DISPLAY DEVICES

CROSS-REFERENCE TO RELATED APPLICATION

This application is a national stage application under 35 U.S.C. § 371 of International Application No. PCT/CN2017/084738, filed May 17, 2017, which claims priority to Chinese Patent Application No. 201610717857.4, filed Aug. 24, 2016, the contents of which are incorporated by reference in the entirety.

FIELD OF THE DISCLOSURE

The present disclosure generally relates to the field of display technology and, more particularly, relates to a transparent display panel and a display device.

BACKGROUND

In recent years, more and more manufacturers focus on development of transparent displays. Such transparent displays have many advantages to provide thin and light, product, supporting 3D display, and low energy consumption which is conducive to environmental protection and energy conservation.

The transparent displays are widely applied to the store window display due to the "penetrating" property. As such, not only the information displayed on the screen of a transparent display can be seen, but also the objects located behind the transparent display can be seen through the transparent screen. Therefore, both the real product and on-screen product-related information can be presented simultaneously, enabling customers to understand the full range of the product information, and to obtain a better display experience.

The transparent display panel can include a color filter, an array substrate, a liquid crystal cell located between the color filter and the array substrate. The transparent display panel can be divided into multiple display areas for displaying an image, and multiple light transmitted areas for realizing a perspective view.

To achieve a better perspective view, the thickness of the color filter can be reduced to improve the transparent rate of the light transmitted areas. But the color filter in the conventional liquid crystal display can be a key factor to provide a good color saturation and color gamut. Therefore, reducing the thickness of the color filter may achieve a better perspective effect, but may affect the display effect of the display areas of the transparent display.

This disclosure provides a transparent display panel and a related display device to solve one or more problems set forth above and other problems.

BRIEF SUMMARY OF THE DISCLOSURE

In accordance with some embodiments of the present disclosure, a transparent display panel and a related display device are provided.

One aspect of present disclosure provides a transparent display panel including: a color filter. The color filter includes a first region configured to realize a screen view and a second region configured to display a perspective image. The second region has a thickness smaller than the first region.

Optionally, the second region is transparent.

Optionally, the thickness of the color filter in the second region is zero.

Optionally, the transparent display panel further includes a first substrate, a second substrate, and a liquid crystal layer disposed between the first substrate and second substrate. The color filter is on one of the first substrate and the second substrate.

Optionally, the color filter includes a plurality of the first regions and a plurality of the second regions, the first regions and the second regions being alternatively arranged.

Another aspect of present disclosure provides a transparent display device including the disclosed transparent display panel.

Optionally, the transparent display device further includes a first polarizer at a light-incident side of the transparent display panel.

Optionally, the transparent display device further includes a second polarizer at a light-exiting side of the transparent display panel.

Optionally, a transmission axis direction of the first polarizer is perpendicular with a transmission axis direction of the second polarizer.

Optionally, the transparent display device further includes an antireflective film on the second polarizer.

Optionally, a thickness of the an reflective film is $\lambda/4*(4k+1)$, wherein k is an integer no less than 0, and $\lambda$ is a wavelength of a visible light.

Optionally, the second polarizer includes a plurality of third regions corresponding to the display areas, and a plurality of fourth regions corresponding to the light transmitted areas.

Optionally, the transparent display device further includes a plurality of quarter-wave plates at the plurality of fourth regions of the second polarizer.

Optionally, the light-exiting side of the transparent display panel includes a plurality of fifth regions corresponding to the display areas, and a plurality of sixth regions corresponding to the light transmitted areas; and the second polarizer is at the light-exiting side of the transparent display panel in the plurality of fifth regions.

Optionally, a plurality of quarter-wave plates at the light-exiting side of the transparent display panel in the plurality of sixth regions.

Optionally, the light-incident side of the transparent display panel includes a plurality of seventh regions corresponding to the display areas, and a plurality of eighth regions corresponding to the light transmitted areas; and the light-exiting side of the transparent display panel includes a plurality of ninth regions corresponding to the display areas, and a plurality of tenth regions corresponding to the light transmitted areas.

Optionally, the first polarizer is at the light-incident side of the transparent display panel in the plurality of seventh regions; and the second polarizer is at the light-exiting side of the transparent display panel in the plurality of ninth regions.

Optionally, the transparent display device further includes a plurality of quarter-wave plates at the light-exiting side of the transparent display panel in the plurality of tenth regions.

Optionally, the first polarizer and the second polarizer have a same structure.

Optionally, the first polarizer includes layers of triacetate fiberboards, and a polyvinyl alcohol fiberboard between the layers of triacetate fiberboards.

Other aspects of the present disclosure can be understood by those skilled in the art in light of the description, the claims, and the drawings of the present disclosure.

BRIEF DESCRIPTION OF THE DRAWINGS

Various objectives, features, and advantages of the present disclosure can be more fully appreciated with reference to the detailed description of the present disclosure when considered in connection with the following drawings, in which like reference numerals identify like elements. It should be noted that the following drawings are merely examples for illustrative purposes according to various disclosed embodiments and are not intended to limit the scope of the present disclosure.

DETAILED DESCRIPTION

Reference input now be made in detail to exemplary embodiments of the invention, which are illustrated in the accompanying drawings in order to fully understand and being able to implementing the present disclosure and to realizing the technical effect. It should be understood that the following description has been made only by way of example, but not to limit the present disclosure. Various embodiments of the present disclosure and various features in the embodiments that are not conflicted with each other can be combined and rearranged in various ways. Without departing from the spirit and scope of the present disclosure, modifications, equivalents, or improvements to the present disclosure are understandable to those skilled in the art and are intended to be encompassed within the scope of the present disclosure.

In accordance with various embodiments, the present disclosure provides a transparent display panel and a related display device. The disclosed display panel and the related display device can improve the perspective effect of the light transmission areas without affecting the display effect of the display areas.

In the disclosed transparent display panel, the color filter can include a plurality of first regions corresponding to a plurality of display areas of the transparent display panel, and a plurality of second regions corresponding to a plurality of light transmitted areas of the transparent display panel. The color filter in the second regions can have a thickness smaller than the color filter in the first regions. The first regions can be configured to realize a screen view and the second region can e configured to display a perspective image.

As such, in the display areas, because the thickness of the color filter is unreduced, the color saturation and color gamut may not be affected, so that the display areas of the transparent display may not be affected. In the light transmitted areas, the thickness of the colored film substrate is reduced, so that the perspective effect of the light transmitted areas can be improved.

Figure 1:
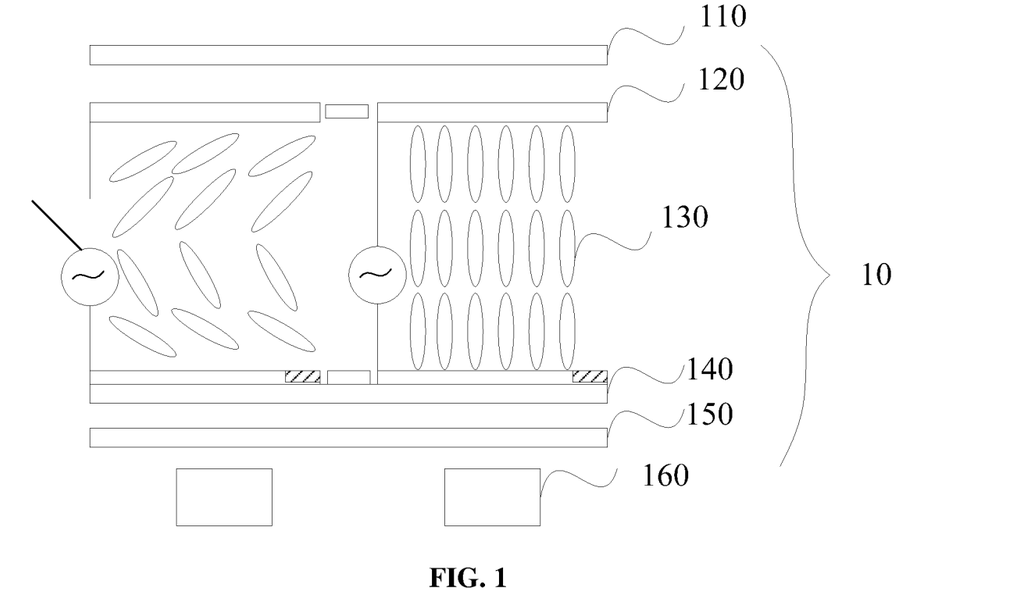
FIG. 1 illustrates a schematic structural diagram of a transparent display panel.

Referring to FIG. 1, a schematic structural diagram of a transparent display panel is shown. As illustrated, the transparent display panel 10 can include a color filter 120, an array substrate 140, a liquid crystal layer 130 between the color filter 120 and the array substrate 140, a first polarizer 150 and a second polarizer 110 attached on the transparent display panel 10, and a light source 160.

A light emitted from the light source 160 can be omnidirectional. After passing through the first polarizer 150, the omnidirectional light can become a unidirectional polarized light, or a linear polarized light. The liquid crystal molecules aligned in the liquid crystal layer 130 can have an optical rotation. When no electric field is applied to the array substrate 140 and the color filter 120, the aligned liquid crystal molecules can remain optically active.

The unidirectional polarized light form by the first polarizer 150 can be transmitted through the aligned liquid crystal molecules to rotate 90 or 270 degrees, and then be projected to the red, green, and blue primary colors of the pixels on the color filter 120. It should be noted that, the liquid crystal molecules can be aligned by applying an electromagnetic filed. By control the direction of the electromagnetic filed, the liquid crystal molecules can be rotated, such that the transmitted unidirectional polarized light can be rotated by a desired angle.

Next, the light can pass through the second polarizer 110 which is perpendicular to the first polarizer 150 to realize a display effect. The presentation of the various colors can be achieved by different combinations of the three primary colors of red, green and blue in the pixels on the color filter 120.

Such combinations can be achieved by changing the alignment of the liquid crystal molecules in the liquid crystal layer 130 by applying an electric field between the array substrate 140 and the color filter 120 to change the optical rotation of the liquid crystal molecules, if the unidirectional polarized light form by the first polarizer 150 is not rotated, it cannot pass through second polarizer 110, and can present a black color display effect.

The transparent display panel 10 can be divided into multiple display areas for displaying an image, and multiple light transmitted areas for realizing a perspective view. The real scene that needs to be perspective is behind the display screen, i.e., behind the first polarizer 150. Thus, the structural pans of the light source 160 such as a lamp cannot be directly disposed in the display area as in the conventional liquid crystal display. As such, the light transmitting from a vertical direction can only be achieved through other ways such as reflection, refraction, etc., so that the light utilization may be greatly reduced. Therefore, to achieve a better display effect, the transparent display may need a higher brightness.

Further, in order to achieve a better perspective, the thickness of the color filter 120 can be reduced to get, a better transparency effect. The color filter 120 can be a key factor for providing good color saturation and color gamut in a conventional liquid crystal display. So reducing the thickness of the color filter of the transparent display can increase the transparency and increase the real-object display effect, but can also reduce the on-screen display effect. That is, the transparent display cannot have both of the real-object perspective display effect and the on-screen display effect.

In addition, regarding to outdoor display, due to the outdoor sunlight or strong outside light interference, both of the real-object perspective display effect and the on-screen display effect may be further weakened. Accordingly, the disclosed transparent display panel and a related display device are provided to improve the perspective effect of the fight transmitted areas without affecting the display areas of the transparent display.

Figure 2A:
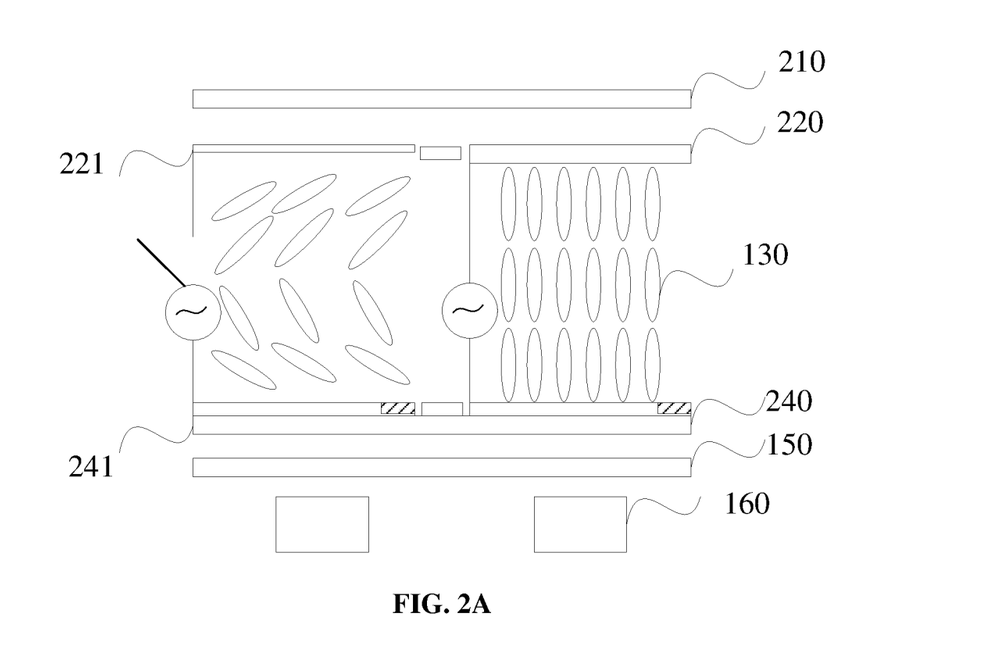
FIGS. 2A-2B illustrates schematic structural diagrams of exemplary transparent display panels in accordance with some embodiments of the present disclosure.
Figure 2B:
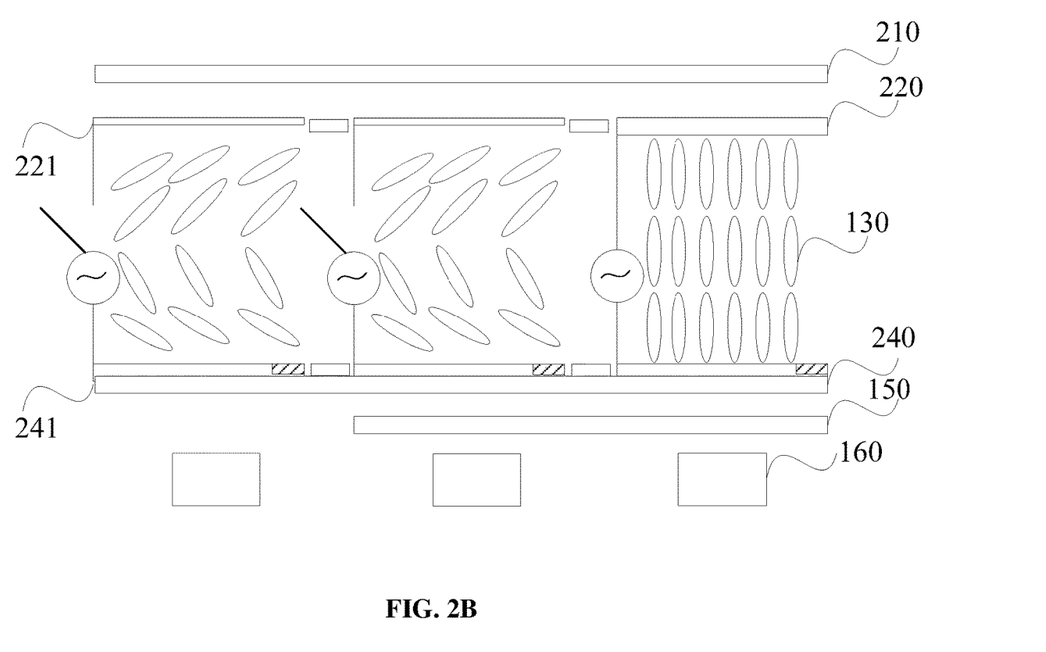

Referring to FIGS. 2A-2B, exemplary transparent display panels are shown in accordance with some embodiments of the present disclosure. As illustrated, the transparent display panel 20 can include a color filter, an array substrate 240, a liquid crystal layer 130 between the color filter and the array substrate 240.

The transparent display panel can includes multiple display areas for displaying a screen image, and multiple light transmitted areas for realizing a perspective view. The display principle of the transparent display panel can be referred to the above description in connection with FIG. 1, which is not repeated herein.

The color filter can include multiple first regions 220 corresponding to the display areas, and multiple second regions 221 corresponding to the light transmitted areas. The thickness of the color filter in the first regions 220 can be unreduced. The thickness of the color filter in the second region 221 can be smaller than the thickness of the color filter in the first regions 220.

In various embodiments, the transparent display panel may include any suitable arrangements for the display areas and the light transmitted areas. For example, the display areas and the light transmitted areas may be alternatively arranged in a lateral direction. Accordingly, the first regions 220 corresponding to the display areas, and second regions 221 corresponding to the light transmitted areas may be alternatively arranged in the lateral direction.

In another example, the display areas and the light transmitted areas may be arranged according to a certain pattern in a lateral direction. Accordingly, the first regions 220 corresponding to the display areas, and second regions 221 corresponding to the light transmitted areas may be arranged following that pattern in the lateral direction. For example, shown as in FIG. 2B, two second regions 221 corresponding to the light transmitted areas may be arranged together adjacent to at least one first region 220 corresponding to the display area.

As such, in the display areas, because the thickness of the color filter is unreduced, the color saturation and color gamut may not be affected, so that the display areas of the transparent display may not be affected. In the light transmitted areas, the thickness of the colored film substrate is reduced, so that the perspective effect of the light transmitted areas can be improved.

In the light transmitted areas, the light emitted from the light source 160 can pass through the first polarizer 150 to form a unidirectional polarized light. The liquid crystal molecules aligned in the liquid crystal layer 130 can have an optical rotation. Since there is no electric field applied between the subpixel 241 on the array substrate 240 and the color filter in the first regions 220, the aligned liquid crystal molecules can maintain the optical rotation.

The unidirectional polarized light formed by the first polarizer 150 can go through the liquid crystal molecules and rotate by 90 or 270 degrees, and then be projected onto the color filter in the second regions 221.

The thickness of the color filter in the second regions 221 is smaller than the thickness of the color filter in the first regions 220. In some embodiments, the color filter in the second regions 221 may have a thickness of 0. That is, the color filter only disposed in the first regions 220. In some alternative embodiments, the color filter in the second regions 221 can be transparent.

As such, the light emitted from the liquid crystal layer 130 can directly transmit through the second polarizer 210 which is perpendicular to the first polarizer 150, thereby being able to realize a perspective view of the real objects in actual colors. Therefore, the influence of the color film on the perspective effect can be desirably minimized, and the perspective effect of light transmitted areas can be desirably improved.

Further, by changing the area ratio of the sub-pixels 241 in the pixels, that is, by changing, the area ratio between the first region and the second region, the whole perspective effect of the transparent display panel 20 can be changed. If a better perspective effect is desired, the area of the first regions may be designed to be smaller than the area of the second regions, if a better display effect is desired, the area of the first regions may be designed to be larger than the area of the second regions.

Another aspect of the present disclosure provides a display device including the disclosed transparent display panel described above in connection with FIGS. 2A-2B. In some embodiments, the display device can further include a first polarizer at the light-incident side of the transparent display panel, and a second polarizer at the light-exiting side of the transparent display panel. The direction of the light transmission axis of the first polarizer can be perpendicular to the direction of the transmission axis of the second polarizer.

In order to enhance the perspective effect, the structure of the display device can be adjusted to reduce the influence of the outdoor ambient light. That is, the reflection of ambient light can be minimized.

Figure 3:
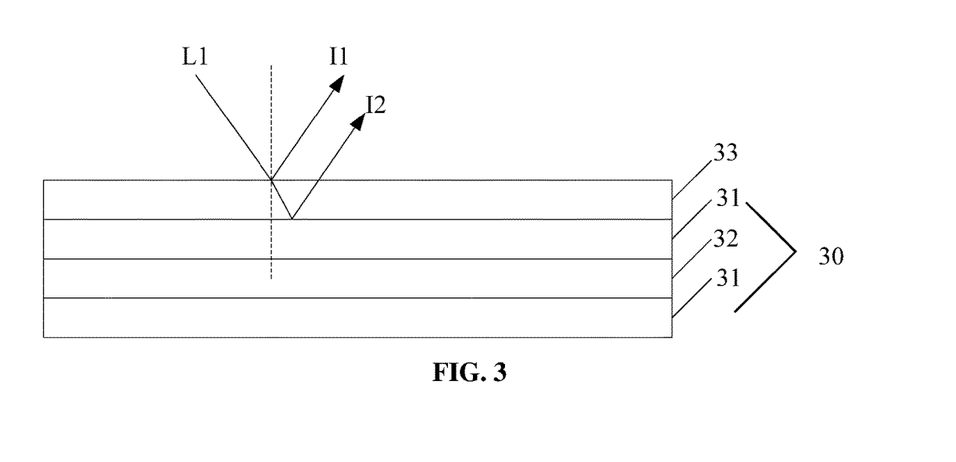
FIG. 3 illustrates a schematic diagram of an exemplary antireflection coating on a second polarizer in accordance with some embodiments of the present disclosure.

Referring to FIG. 3, a schematic diagram of an exemplary antireflection coating on a second polarizer is shown in accordance with some embodiments of the present disclosure. As illustrated, an antireflective film 33 can be configured on the second polarizer 30. The antireflective can be used to minimize the reflection of the ambient light, thereby reducing the influence of the outdoor ambient light on the perspective effect, and further improving the display effect of the transparent display panel.

Specifically, the second polarizer can include two layers of triacetate fiberboards 31, and a polyvinyl alcohol fiberboard 32. The structure of the first polarizer can be as same as the second polarizer. The antireflective film 33 can be coated on an upper side of the second polarizer. A thickness of the antireflective film 33 can be $\lambda/4*(4k+1)$, k is an integer no less than 0, and $\lambda$ is the wavelength of a visible UAL As shown in FIG. 3, the incident ambient light L1 can be formed two reflected lights I1 and I2 on the upper and lower surfaces of the antireflective film 33 respectively. The two reflected lights I1 and I2 can interfere with each other and cancelled out. As such, the incident ambient light can be redistributed, thereby reducing the reflection of light and increasing the transmission rate of light. Therefore, the perspective effect of the transparent display panel can be improved.

In some alternative embodiments, the first polarizer can lie at the light-incident side of the transparent display panel. The light-exiting side of the transparent display panel can include multiple fifth regions corresponding to the display areas, and multiple sixth regions corresponding to the light transmitted areas. The second polarizer can be attached corresponding to the fifth regions. The direction of the light transmission axis of the first polarizer can be perpendicular to the direction of the transmission axis of the second polarizer.

Figure 6:
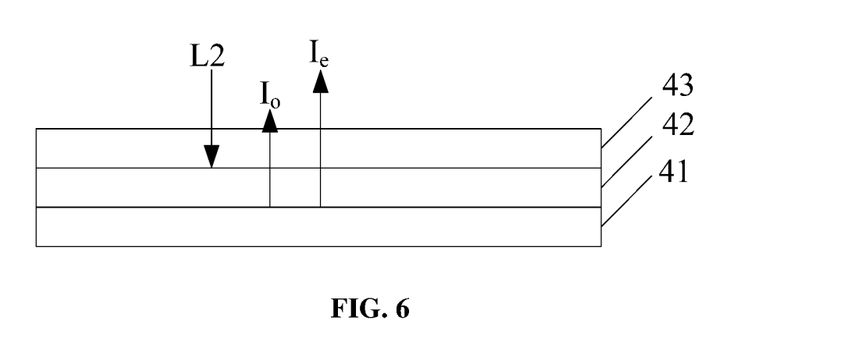
FIGS. 6 and 7 illustrate schematic diagrams showing a cancellation between an ordinary light and extraordinary light outputted from a quarter-wave plate in accordance with some embodiments of the present disclosure.
Figure 7:
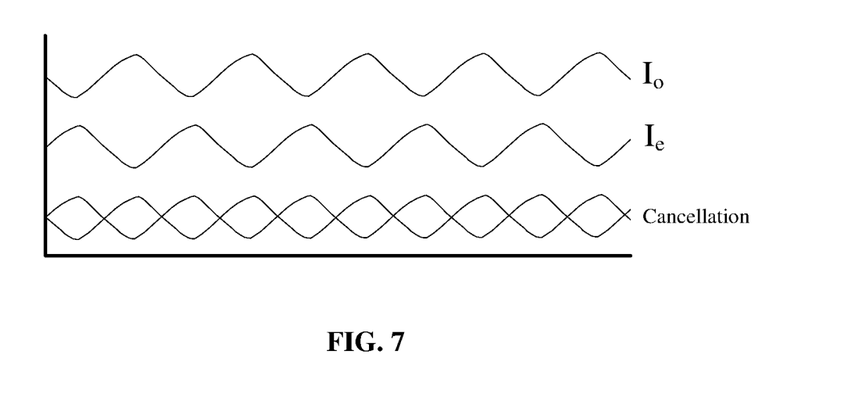

Referring to FIGS. 6 and 7, schematic diagrams of a cancellation between an ordinary light and extraordinary light outputted from a quarter-wave plate are shown in accordance with some embodiments of the present disclosure.

As shown in FIG. 6, the second polarizer may not be at the sixth regions. A quarter-wave plate 43 can be attached in each sixth region. The liquid crystal layer 42 can be located between the first polarizer 41 and the quarter-wave plate 43.

Specifically, the second polarizer can include two layers of triacetate fiberboards, and a polyvinyl alcohol fiberboard sandwiched between the two layers of triacetate fiberboards. The structure of the first polarizer can be as same as the second polarizer.

Figure 4:
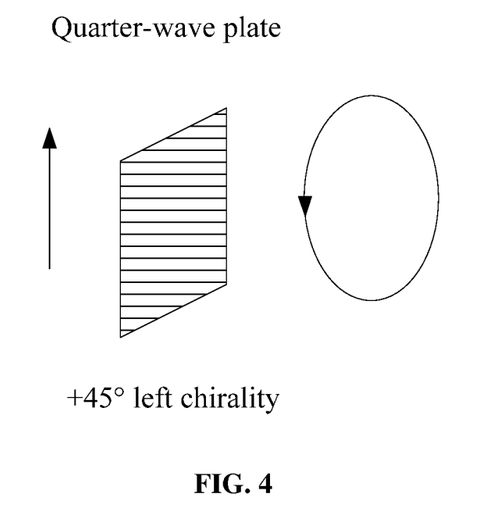
FIGS. 4 and 5 illustrate schematic diagrams of an exemplary quarter-wave plates in accordance with same embodiments of the present disclosure.
Figure 5:
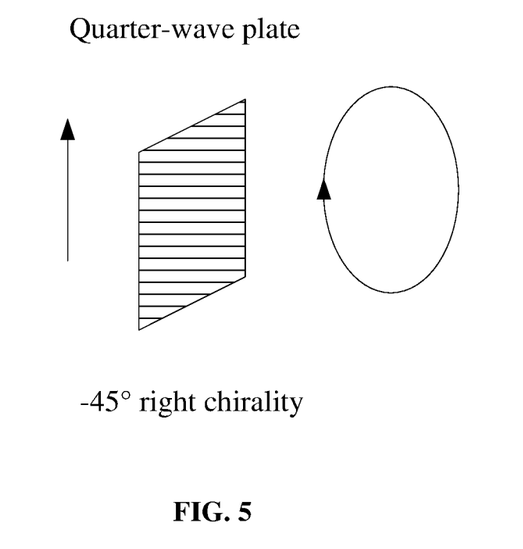

Referring to FIGS. 4 and 5, schematic diagrams of an exemplary quarter-wave plates are shown in accordance with some embodiments of the present disclosure. In some embodiments, the conventional polarizer corresponding to the transparent subpixel on the color filter in the second region 221 can be designed to have a quarter-wave plate structure to form a composite polarizer.

In optics, the quarter-wave plate can be a birefringent single-crystal wafer. When an incident light passes through the quarter-wave plate in a normal direction, the ordinary light (o-light) and the extraordinary light (e-light) can have a Phase difference equal to $\pi/2$ or odd times of $\pi/2$.

Another feature of quarter-wave plate is that it can realize a mutual conversion between a linear polarized light and an elliptical polarized light. If the direction angles between a linear polarized light and an optical axis of the quarter-wave plate equals to 45 degrees, the elliptical polarized light can be converted to a circular polarized light.

As illustrated in FIGS. 4 and 5, when the direction angle between the linear polarized light and an optical axis of the quarter-wave plate is positive, the formed circular polarized light can have a left chirality. When the direction angle between the linear polarized light and an optical axis of the quarter-wave plate is negative, the formed circular polarized light can have a right chirality.

FIG. 6 shows an analysis of the ambient light path the sixth region when a second polarizer is not attached and only a quarter-wave plate is attached. The ambient light can enter the quarter-wave plate and reflect at the lower surface of the quarter-wave plate.

When the ambient light enters into the quarter-wave plate, a birefringence phenomenon can occur. A phase difference between the ordinary light (o-light) and the extraordinary light (e-light) of the refracted light can be equal to $\pi/2$ or odd times of $\pi/2$.

When the light reflected back from the lower surface, the light enters into the quarter-wave plate again. A phase difference between the ordinary light (o-light) and the extraordinary light (e-light) of the reflected light can be equal to a or odd times of $\pi$.

As shown in FIG. 7, the ordinary light (o-light) and the extraordinary light (e-light) can cancel each other out when the light emits from the quarter-wave plate. Therefore, the external reflected light can be reduced, and the perspective effect of the transparent display panel can be improved.

Figure 8:
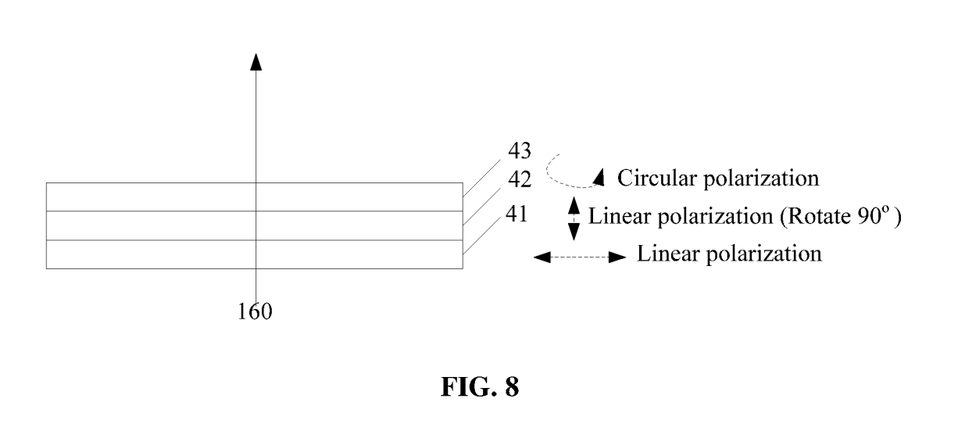
FIG. 8 illustrates a schematic, diagram of an exemplary quarter-wave plate directly at a light transmitted area on a light-exiting side in accordance with some embodiments of the present disclosure.

Referring to FIG. 8, a schematic diagram of an exemplary quarter-wave plate directly at a light transmitted area on a light-exiting side is shown in accordance with some embodiments of the present disclosure. The optical path of the light emitted from the light source 160 in the transparent display is illustrated.

The light emitted from the light source 160 can pass through the second polarizer to form a unidirectional polarized light, or a linear polarized light. Then, the unidirectional polarized light can go through the liquid Crystal layer which can rotate the unidirectional polarized light by 90 degrees due to the optical rotation of the liquid crystal molecules. Next, the unidirectional polarized light can go through the quarter-wave plate to form a circular polarized light.

It should be noted that, during the whole transmitting process, the polarization of the emitted light is changed from a unidirectional polarization to a circular polarization. However, the amount of light relative to the original display is unreduced.

In some alternative embodiments, the first polarizer can be at the light-incident side of the transparent display panel. The second polarizer can be at the light-exiting side of the transparent display panel. The direction of the light transmission axis of the first polarizer can be perpendicular to the direction of die transmission axis of the second polarizer.

Specifically, the second polarizer can include two layers of triacetate fiberboards, and a polyvinyl alcohol fiberboard sandwiched between the two layers of triacetate fiberboards. The structure of the first polarizer can be as same as the second polarizer.

In order to enhance the perspective effect, the structure of the display device can be adjusted to reduce the influence of the outdoor ambient light. That is, the reflection of ambient light can be minimized.

Figure 9:
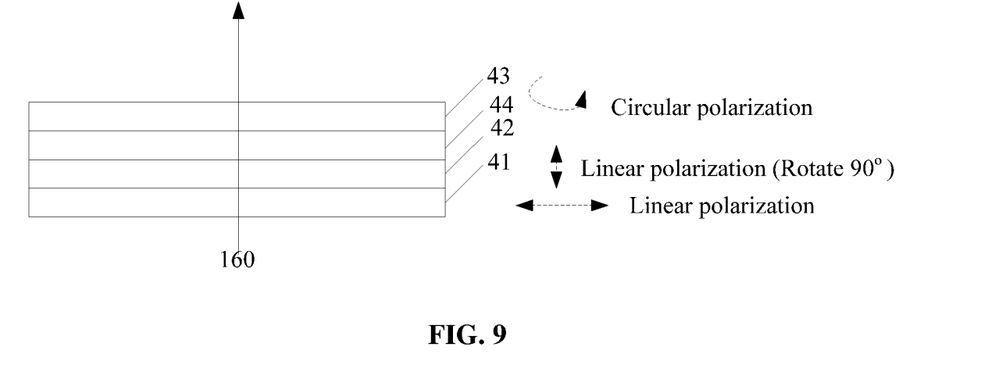
FIG. 9 illustrates a schematic diagram of an exemplary quarter-wave plate at a light transmitted area of the second polarizer in accordance with some embodiments of the present disclosure.

Referring to FIG. 9, a schematic diagram of an exemplary quarter-wave plate at a light transmitted area of the second polarizer is shown in accordance with some embodiments of the present disclosure. As illustrated, the second polarizer can include a third region corresponding to the display area, and a fourth region corresponding to the light transmitted area. A quarter-wave plate 43 can be attached in the fourth region.

In optics, the quarter-wave plate can be a birefringent single-crystal wafer. When an incident light passes through the quarter-wave plate in a normal direction, the ordinary light (o-light) and the extraordinary light (e-light) can have a phase difference equal to $\pi/2$ or odd times of $\pi/2$.

Another feature of quarter-wave plate is that it can realize a mutual conversion between a unidirectional polarized light (or linear polarized light) and an elliptical polarized light. If the direction angles between a linear polarized light and an optical axis of the quarter-wave plate equals to 45 degrees, the elliptical polarized light can be converted to a circular polarized light.

As illustrated in FIGS. 4 and 5, when the direction angle between the linear polarized light and an optical axis of the quarter-wave plate is positive, the formed circular polarized light can have a left chirality. When the direction angle between the linear polarized light and an optical axis of the quarter-wave plate is negative, the formed circular polarized light can have a right chirality.

The ambient light can enter the quarter-wave plate and reflect at the lower surface of the quarter-wave plate. When the ambient light enters into the quarter-wave plate, a birefringence phenomenon can occur. A phase difference between the ordinary light (o-light) and the extraordinary light (e-light) of the refracted light can be equal to π/2 or odd times of π/2.

When the light reflected back from the lower surface, the light enters into the quarter-wave plate again. A phase difference between the ordinary light (o-light) and the extraordinary light (e-light) of the reflected light can be equal to π or odd times of π.

The ordinary light (o-light) and the extraordinary light (e-light) can cancel each other out when the light emits from the quarter-wave plate. Therefore, the external reflected light can be reduced, and the perspective effect of the transparent display panel can be improved.

In some alternative embodiments, the light-incident side of the transparent display panel can include multiple seventh regions corresponding to the display areas, and multiple eighth regions corresponding to the light transmitted areas. The light-exiting side of the transparent display panel can include multiple ninth regions corresponding to the display areas, and multiple tenth regions corresponding to the light transmitted areas.

The first polarizer can be attached corresponding to the seventh regions. The second polarizer can be attached corresponding to the ninth regions. The direction of the light transmission axis of the first polarizer can be perpendicular to the direction of the transmission axis of the second polarizer.

Specifically, the second polarizer can include two layers of triacetate fiberboards, and a polyvinyl alcohol fiberboard sandwiched between the two layers of triacetate fiberboards. The structure of the first polarizer can be as same as the second polarizer.

Figure 10:
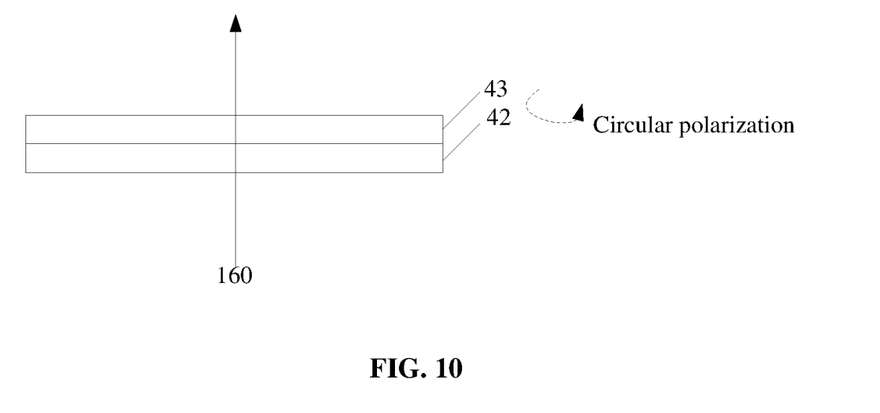
FIG. 10 illustrates a schematic diagram of an exemplary quarter-wave plate attached without a polarizer in accordance with some embodiments of the present disclosure.

Referring to FIG. 10, a schematic diagram of an exemplary quarter-wave plate attached without a polarizer is shown in accordance with some embodiments of the present disclosure. As illustrated, the first polarizer may not, be attached the eighth region, and a quarter-wave plate 43 can attached in the tenth region.

The ambient light can enter the quarter-wave plate and reflect at the lower surface of the quarter-wave plate. When the ambient light enters into the quarter-wave plate, a birefringence phenomenon can occur. A phase difference between the ordinary light (o-light) and the extraordinary light (e-light) of the refracted light can be equal to π/2 or odd times of π/2.

When the light reflected back from the lower surface, the light enters into the quarter-wave plate again. A phase difference between the ordinary light (o-light) and the extraordinary light (o-light) of the reflected light can be equal to a or odd times of π.

The ordinary light (o-light) and the extraordinary light (e-light) can cancel each other out when the light emits from the quarter-wave plate. Therefore, the external reflected light can be reduced, and the perspective effect of the transparent display panel can be improved.

It should be noted that, in the embodiments described above in connection with FIG. 10, the light emitted from the light source 160 can have a best optical effect when exits from the transparent display panel, since the light is only rotated through the liquid crystal molecules once and then passes through the quarter-wave plate without any loss of the polarized light.

The provision of the examples described herein (as well as clauses phrased as "such as," "e.g.," "including," and the like) should not be interpreted as limiting the claimed subject matter to the specific examples; rather, the examples are intended to illustrate only some of many possible aspects.

Accordingly, a transparent display panel and a related display device are provided.

Although the present disclosure has been described and illustrated in the foregoing illustrative embodiments, it is understood that the present disclosure has been made only by way of example, and that numerous changes in the details of embodiment of the present disclosure can be made without departing from the spirit and scope of the present disclosure, which is only limited by the claims which follow. Features of the disclosed embodiments can be combined and rearranged in various ways. Without departing from the spirit and scope of the present disclosure, modifications, equivalents, or improvements to the present disclosure are understandable to those skilled in the art and are intended to be encompassed within the scope of the present disclosure.

What is claimed is:

1. A transparent display apparatus having a plurality of subpixels, a plurality of the first regions respectively in the plurality of subpixels configured to realize a screen view, and a plurality of the second regions respectively in the plurality of subpixels configured to display a perspective image, comprising:
    a first light modulating layer at a light-incident side of the transparent display apparatus, wherein the first light modulating layer comprises a plurality of first polarization blocks respectively at least in the plurality of first regions;
    a second light modulating layer at a light-exiting side of the transparent display apparatus, wherein the second light modulating layer comprises a plurality of second polarization blocks respectively in the plurality of first regions, and consists of a plurality of quarter-wave plates respectively limited to the plurality of second regions in which no data signal is applied, the plurality of second polarization blocks and the plurality of quarter-wave plates alternately arranged; and
    a liquid crystal layer extending throughout the plurality of the first regions and the plurality of the second regions;
    wherein the plurality of second polarization blocks have a transmission axis direction substantially perpendicular to a transmission axis direction of the plurality of first polarization blocks;
    the plurality of second regions are substantially transparent;
    the plurality of quarter-wave plates and the liquid crystal layer in the plurality of second regions are optically coupled to allow light from the light-incident side of the transparent display apparatus to transmit through the plurality of second regions, and emit out of the plurality of quarter-wave plates; and
    the plurality of second regions are completely absent of any polarizer on a side of the plurality of quarter-wave plates away from the liquid crystal layer.

2. The transparent display apparatus of claim 1, further including:
    a first substrate,
    a second substrate,
    the liquid crystal layer disposed between the first substrate and second substrate, and
    a color filter on one of the first substrate and the second substrate.

3. The transparent display apparatus of claim 1, wherein:
the first light modulating layer includes layers of triacetate fiberboards, and a polyvinyl alcohol fiberboard between the layers of triacetate fiberboards.

4. The transparent display apparatus of claim 1, wherein the plurality of first polarization blocks constitute a unitary structure and extend substantially throughout the light-incident side of the transparent display apparatus and are in both the plurality of first regions and the plurality of second regions.

5. The transparent display apparatus of claim 1, wherein the plurality of first polarization blocks are absent in the plurality of second regions.

6. The transparent display apparatus of claim 1, further comprising a color filter, a thickness of the color filter in the plurality of second regions is smaller than a thickness of the color filter in the plurality of first regions.

7. The transparent display apparatus claim 6, wherein:
the thickness of the color filter in the plurality of second regions is zero.

8. The transparent display apparatus of claim 1, further comprising:
an antireflective film on the second light modulating layer.

9. The transparent display apparatus of claim 8, wherein:
a thickness of the antireflective film is $\lambda/4*(4k+1)$, wherein k is an integer no less than 0, and $\lambda$ is a wavelength of a visible light.

* * * * *